United States Patent
Folkesson et al.

(10) Patent No.: US 12,530,783 B2
(45) Date of Patent: Jan. 20, 2026

(54) OBJECT TRACKING

(71) Applicant: Telefonaktiebolaget LM Ericsson (publ), Stockholm (SE)

(72) Inventors: Mats Folkesson, Täby (SE); Farnaz Moradi, Stockholm (SE); Selim Ickin, Stocksund (SE); Xiaoyu Lan, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 18/015,981

(22) PCT Filed: Jul. 14, 2020

(86) PCT No.: PCT/EP2020/069909
§ 371 (c)(1),
(2) Date: Jan. 13, 2023

(87) PCT Pub. No.: WO2022/012744
PCT Pub. Date: Jan. 20, 2022

(65) Prior Publication Data
US 2023/0316537 A1    Oct. 5, 2023

(51) Int. Cl.
*G06T 7/20* (2017.01)
*G06T 7/00* (2017.01)
(Continued)

(52) U.S. Cl.
CPC ........... *G06T 7/20* (2013.01); *G06T 7/0002* (2013.01); *G06T 7/70* (2017.01); *G06V 10/774* (2022.01);
(Continued)

(58) Field of Classification Search
CPC .......... G06T 7/20; G06T 7/70; G06T 7/0002; G06T 2200/24; G06T 2207/20081;
(Continued)

(56) References Cited

U.S. PATENT DOCUMENTS

2009/0304230 A1    12/2009  Perera et al.
2011/0142282 A1*   6/2011   Srikrishnan ............. G06T 7/277
                                                          382/103
(Continued)

FOREIGN PATENT DOCUMENTS

| WO | 2013169155 A1 | 11/2013 |
| WO | 2013177586 A1 | 11/2013 |
| WO | 2015196281 A1 | 12/2015 |

OTHER PUBLICATIONS

"Amazon Alexa", Wikipedia, accessed May 1, 2020, <https://en.wikipedia.org/wiki/Amazon_Alexa>, Apr. 30, 2020, 1-27.
(Continued)

*Primary Examiner* — Syed Haider
(74) *Attorney, Agent, or Firm* — Murphy, Bilak & Homiller, PLLC (57) ABSTRACT

There is provided a method comprising: acquiring (110) sensor data related to an object; using the first learning module, identifying (120) the object based on the acquired sensor data using a first learning module and determining (130) a user associated with the identified object; determining (140) a timestamped location of the object based on at least one of the acquired sensor data and one or more locations of the one or more sensors; performing (150) a first analysis to determine whether the current status of the object contains an anomaly based on one or more predefined rules stored in a knowledge base; performing (160) a second analysis to determine whether the current status of the object contains an anomaly, using a second learning module; and validating (170) whether the current status of the object contains an anomaly based on results of the first analysis and results of the second analysis.

20 Claims, 4 Drawing Sheets

(51) Int. Cl.
  *G06T 7/70* (2017.01)
  *G06V 10/774* (2022.01)
  *G06V 10/776* (2022.01)
  *G06V 10/94* (2022.01)
  *G06V 20/50* (2022.01)

(52) U.S. Cl.
  CPC .......... *G06V 10/776* (2022.01); *G06V 10/945* (2022.01); *G06V 20/50* (2022.01); *G06T 2200/24* (2013.01); *G06T 2207/20081* (2013.01)

(58) Field of Classification Search
  CPC .... G06V 20/50; G06V 10/774; G06V 10/776; G06V 10/945
  See application file for complete search history.

(56) References Cited

U.S. PATENT DOCUMENTS

| | | | | |
|---|---|---|---|---|
| 2016/0110975 | A1* | 4/2016 | Oppenheimer | G06N 3/08 340/572.1 |
| 2019/0347518 | A1 | 11/2019 | Shrestha et al. | |
| 2020/0160505 | A1* | 5/2020 | Kohler | G06N 20/00 |
| 2021/0142109 | A1* | 5/2021 | Sinha | G06N 3/045 |
| 2023/0186509 | A1* | 6/2023 | Ryan | G06V 10/774 382/103 |

OTHER PUBLICATIONS

"Siri", Wikipedia, accessed May 1, 2020, <https://en.wikipedia.org/wiki/Siri>, Apr. 22, 2020, 1-10.

Bi, Fangming, et al., "Review on Video Object Tracking Based on Deep Learning", Journal of New Media, vol. 1, No. 2, 2019, 63-74.

Grech, Raphael, et al., "A Vision-Based System for Object Identification and Information Retrieval in a Smart Home", de Ruyter B. et al. (eds.), Ambient Intelligence, Lecture Notes in Computer Science, vol. 6439, 2019, 239-247.

Motionloft, "We count vehicles and pedestrians in real-time using computer vision", Video screenshots, <https://vimeo.com/95553975>, May 16, 2014, 1-19.

Shoemaker, Larry, et al., "Anomaly Detection Using Emsembles", Multiple Classifier Systems, Lecture Notes in Computer Science, vol. 6713, 2011, 6-15.

\* cited by examiner

OBJECT TRACKING

TECHNICAL FIELD

The present disclosure relates to the field of object location tracking, and in particular to object location tracking with respect to their users and/or owners and the determination of possible anomalies in the tracking results.

BACKGROUND

In modern life people are highly dependent on personal items such as mobile phones, keys, glasses, clothing items (e.g. hats and gloves) and also items such as bags and umbrellas. However, sometimes it is easy to forget the location of all these items, and one must spend precious time looking for these items not selfdom in a stressful situation, for example when in a hurry leaving home. There is currently a lack of straightforward solutions for individuals to keep track of their personal items.

There are some existing solutions for location tracking of items, e.g. personal items. For example, there are some virtual assistants can be implemented in smart phones, tablets, or smart speakers that include features for allowing personal (and common) items to be tracked and located.

As another example, there are techniques involving event-vs-location tracking. United States patent application US 2019/0347518 A1 discloses a system for artificially intelligent image data analysis and event detection, which includes an event detection module that functions to detect events based on contextual metadata data and/or semantic information. Grech R. et al (2010) "A Vision-Based System for Object Identification and Information Retrieval in a Smart Home" (In: de Ruyter B. et al. (eds) Ambient Intelligence. AmI 2010. Lecture Notes in Computer Science, vol 6439. Springer, Berlin, Heidelberg) describes a hand held device for assisting people to locate and retrieve information about objects in a home, which relies on computer techniques to locate a tagged object situated in the environment.

SUMMARY

In another context, in a factory environment some equipment could be shared between workers for different purposes, such as testing, troubleshooting, repainting, etc. These equipment can easily be misplaced, forgotten, or lost in many different locations. It costs time and effort to locate these equipment for their users or owners.

The location tracking may not need to be very accurate (e.g. mm-accuracy) and it would still be useful to at least determine in which room an item is located even in the order of a ~5-10 m error margin. In some cases, it may also be enough to determine the number of a certain item type in a location, e.g. "one small umbrella that belongs to User A at home".

Many existing solutions do not allow detecting specific users. In the case of tracking personal items, most of these techniques require items to be tagged (e.g. with an RFID tag). The use of additional tags on items, in particular smaller items, may be costly and tedious since typically these tags require the process of manual pairing and feeding/introduction to the tracking system.

One aspect of the present disclosure provides computer-implemented method for object tracking using machine learning. The method comprises acquiring sensor data from one or more sensors, the sensor data being related to an object. The method further comprises identifying the object based on the acquired sensor data using a first learning module, the first learning module comprising a supervised or unsupervised learning module. The method further comprises determining a user associated with the identified object using the first learning module. The method further comprises determining a timestamped location of the identified object based on at least one of the acquired sensor data and one or more locations of the one or more sensors. The method further comprises performing a first analysis to determine whether the current status of the identified object contains an anomaly based on one or more predefined rules stored in a knowledge base, the current status being defined by: an identifier of the identified object, the determined user associated with the identified object, and the timestamped location of the identified object. The method further comprises performing a second analysis to determine whether the current status of the identified contains an anomaly, using a second learning module, the second learning module comprising a semi-supervised or unsupervised learning module. The method further comprises validating whether the current status of the identified object contains an anomaly based on results of the first analysis and results of the second analysis.

Another aspect of the disclosure provides a computer program product comprising a computer readable medium, the computer readable medium having computer readable code embodied therein. The computer readable code is configured such that, on execution by a suitable computer or processor, the computer or processor is caused to perform the method as described herein.

Another aspect of the disclosure provides a system for object tracking using machine learning comprising: one or more processors and a memory. The memory stores instructions that, when executed by the one or more processors, cause the system to: acquire sensor data from one or more sensors, the sensor data being related to an object. When the instructions are executed by the one or more processors, the system is further caused to identify the object based on the acquired sensor data using a first learning module, the first learning module comprising a supervised or unsupervised learning module. When the instructions are executed by the one or more processors, the system is further caused to determine a user associated with the identified object using the first learning module, When the instructions are executed by the one or more processors, the system is further caused to determine a timestamped location of the identified object based on at least one of the acquired sensor data and one or more locations of the one or more sensors. When the instructions are executed by the one or more processors, the system is further caused to perform a first analysis to determine whether the current status of the identified object contains an anomaly based on one or more predefined rules stored in a knowledge base, the current status being defined by: an identifier of the identified object, the determined user associated with the identified object, and the timestamped location of the identified object. When the instructions are executed by the one or more processors, the system is further caused to perform a second analysis to determine whether the current status of the identified contains an anomaly, using a second learning module, the second learning module comprising a semi-supervised or unsupervised learning module. When the instructions are executed by the one or more processors, the system is further caused to validate whether the current status of the identified object contains an anomaly based on results of the first analysis and results of the second analysis.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Embodiments of the disclosure advantageously allow items of users and their locations to be tracked together without having to introduce the use of identification tags such as RFID tags or wireless connectivity. As such, these embodiments require less operating and manufacturing costs compared to currently available location tracking solutions. Specifically, embodiments described herein use machine learning techniques for the purpose of tracking user and objects, and in some instances more specifically the drop-off and pick-up events of objects. Sensor data such as data acquired via microphones and cameras can be used as input for systems proposed by embodiments of the present disclosure, and additional data such as data acquired via Wi-Fi routers can help further accuracy of detection and tracking.

In addition, embodiments of the disclosure use knowledge base technology with metadata related to objects (e.g. user/owner, type, size, etc.). An inference engine may be used in combination with the knowledge base, for example when a new item is detected, a link may be established between the new object and its user as well as usual location(s) of other objects of the same type that are associated with the specific user. Unsupervised learning techniques are also used in some embodiments to support identification of objects and their locations by grouping objects together with respect to user(s), location(s), and time of day, etc. This information can be used for determining normal behavior (e.g. an object being placed in a "usual" location associated with its user/owner at certain times/dates) and anomalies. Furthermore, some embodiments of the present disclosure provide a database where usual/common locations of objects are stored. The objects are therefore not expected or needed to be paired with identification tags.

Figure 1:
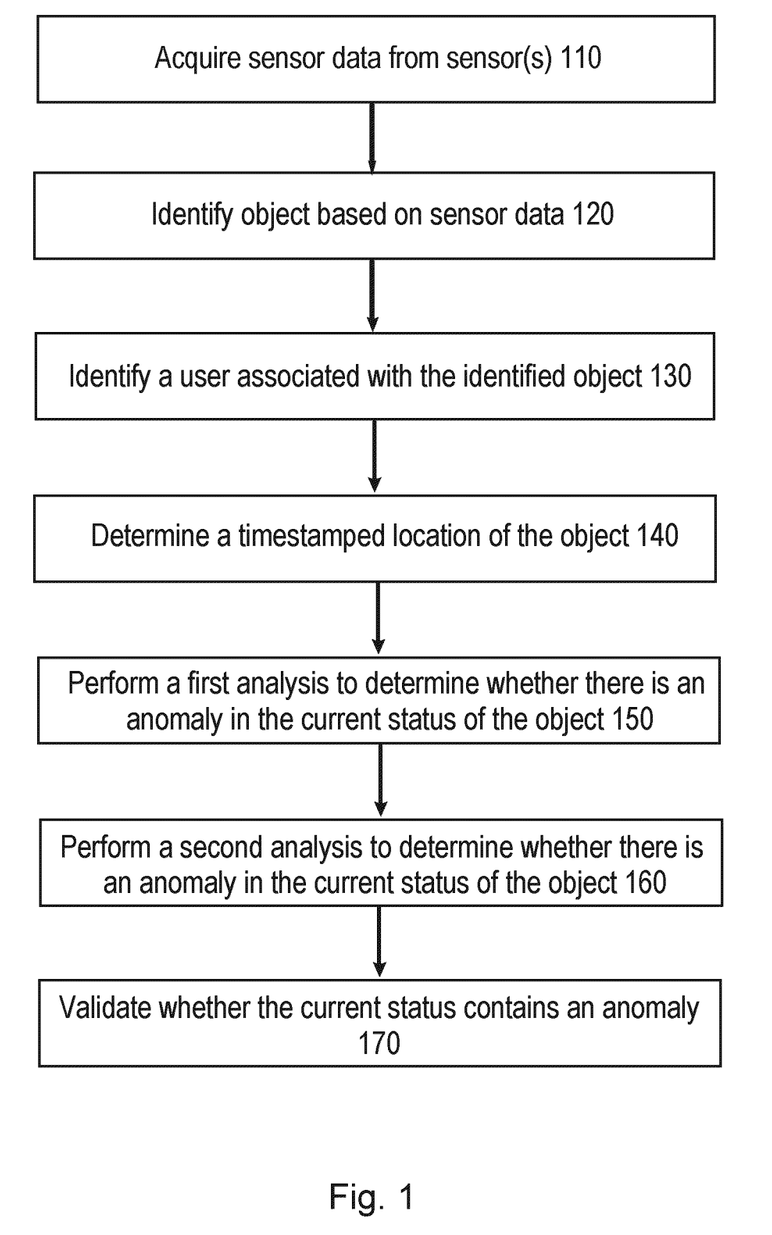
FIG. 1 is a flowchart illustrating a computer-implemented method for object tracking using machine learning, according to an embodiment.

FIG. 1 is a flowchart illustrating a computer-implemented method for object tracking, according to an embodiment. The illustrated method can generally be performed by or under the control of a computer or processor.

With reference to FIG. 1, at step 110, sensor data from one or more sensors is acquired, the sensor data being related to an object. In some embodiments, the sensor data may comprise audio and/or visual sensor data, for example data from a microphone and/or a camera. Also, in some embodiments, the sensor data may be associated with other types of detection techniques, such as motion sensors that are configured to detect opening and/or closing of a door via changes in optical, microwave, or acoustic fields. Furthermore, the sensor data may be acquired in a streaming arrangement at step 110.

At step 120, the object is identified based on the sensor data acquired at step 110 and using a first learning module. The first learning module comprises a supervised or unsupervised learning module. In some embodiments, the first learning module may be pre-trained using information including at least one of: audio and/or visual data associated with one or more usual locations for a plurality of objects (e.g. photos and/or videos of the location(s), sound recordings of an object when being placed in a usual location, etc.), and one or more users associated with the plurality of objects. The pre-training may be performed using federated learning techniques. In this way, the accuracy of identification/determination using the first learning module can be improved.

In some embodiments, identifying the object at step 120 may comprise determining that the object does not correspond to a known object with respect to at least one of the first learning module, the second learning module (which will be described in more detail with reference to step 160 below), and the knowledge base (which will be described in more detail with reference to step 150 below). Details regarding these embodiments will be explained below with reference to step 130.

Returning to FIG. 1, at step 130, a user associated with the identified object is identified using the first learning module.

As mentioned above, in some embodiments identifying the object at step 120 may comprise determining that the object does not correspond to a known object with respect to at least one of the first learning module, the second learning module, and the knowledge base. In these embodiments, determining a user associated with the identified object at step 130 may be performed using an inference engine of the first learning module. Moreover, the inference engine may be used for associating the object with a usual location of an object associated with the determined user, for example an object of a same type (e.g. phones) or similar type (e.g. clothing like gloves and hats).

Returning to FIG. 1, at step 140, a timestamped location of the identified object is determined based on at least one of the sensor data acquired at step 110 and one or more locations of the one or more sensors. Step 140 may be performed in a continuous manner such that location of the identified object is continuously tracked with respect to time. In this case, the determination of the location of the identified object may be interrupted if the object is out of a detection range of the one or more sensors or if a drop-off event is detected.

In some embodiments, the time stamped location of the identified object may be determined at step 140 based on a known location or a detected location of at least one of the one or more sensors.

As an example, the location of the identified object may be determined with respect to at least one of the one or more sensor(s). In this case, the location of a sensor that is used to identify the object may be known (e.g. as it is fixed to a certain location), and the object may be detected or recognized on the basis of that sensor by using object detection techniques. The location of the object can then be determined in the format such as "same room as the camera (sensor)", "in front of camera (sensor) 1", and/or "X cm from camera 1" (where X is a variable). It will be readily appreciated that other formats similar to these examples are also possible in alternative embodiments. In some embodiments, the data from the one or more sensors may be used for both identifying the object and for determining the location of the object. In this case, the location may be determined in the format such as "on the desk", "on the floor", and/or "X cm from the door" (where X is a variable), etc. The former implementation may offer a relatively low-cost approach for determining the location of the object in some cases.

Furthermore, the location(s) of the one or more sensors may be fixed and therefore already known and can be acquired/stored in a straightforward manner. Alternatively, in some embodiments the location(s) of the one more sensors may be determined via the input received at the one or more sensors. For example, using object detection techniques it can be determined that a sensor is "X cm from the door" and/or "Y cm above the floor" (where X and Y are variables), and on this basis the location of the identified object can be determined. Alternatively, in some embodiments the one or more sensors may be mounted on device(s) (e.g. mobile phone, tablet, smart glasses, etc.) and the location(s) of these one or more sensors can be detected using Global Positioning System (GPS), Bluetooth, signal strength, etc. In this instance, the timestamped location may be helpful in informing a user whether an object is inadvertently dropped, and where, in certain contexts (e.g. during jogging, windsurfing, skiing, etc.).

Returning to FIG. 1, at step 150, a first analysis is performed to determine whether the current status of the identified object contains an anomaly based on one or more predefined rules stored in a knowledge base. The current status is defined by at least the following information: an identifier of the identified object, the determined user associated with the identified object, and the timestamped location of the identified object.

The one or more predefined rules in the knowledge base may be associated with at least one of: one or more users associated with an object, and one or more characteristics of an object. For example, the one or more predefined rules may be associated with at least one of: a type of the object, a size of the object, a shape of the object, a color of the object, and a sound associated with movement of the object (e.g. keys being placed at a location). An example of a rule may have the format of "User A has a Type B Phone with Color C often placed near Object D", and if the current status aligns with the rule it can be acknowledged that there is no anomaly in the current status. The one or more rules in the knowledge base may be useful for the identification of the object especially where several objects are very similar to each other.

The knowledge base may be represented as a graph containing information about the common combinations of identifiers of objects, associated users, characteristics of objects (e.g. color) in some embodiments. In these embodiments, a "graph builder" functionality may be provided for converting an input (i.e. at least a part of the current status of the identified object) into a graph for the purpose of comparison. If a match is found from the comparison, the result of step 150 would indicate that there is no anomaly (e.g. an output including a false Boolean variable for an "isAnomaly" field). On the other hand, if the graph corresponding to the input does not match any part of the graph representing the knowledge base, the result of step 150 would indicate that there is an anomaly (e.g. an output including a true Boolean variable of the "is Anomaly" field). For example, the graph corresponding to the input may indicate that user A has object B and that object B has color C, and this observation may not fit into the graph representing the knowledge base because the graph representing the knowledge base expects user A to have an object B with the color D (instead of color C). Therefore, in this case, the result of step 150 would indicate that there is an anomaly in the current status of the object.

As mentioned above with respect to step 110, in some embodiments the method may further comprise detecting a change in location of the object based on the sensor data acquired at step 110. In these embodiments, the current status of the object may be further defined by the detected change in location of the identified object. In these embodiments, performing the first analysis at step 150 may comprise determining whether an entity carrying the object corresponding to the determined user associated with the identified object, based on the one or more predefined rules stored in the knowledge base. The detection of the entity may be based on the sensor acquired at step 110.

Furthermore, in these embodiments, the method may further comprise detecting a pick-up event or a drop-off event of the object based on whether the detected change in location of the identified object involves an instantaneous displacement from a location. A pick-up event is when an object is retrieved or moved from a location, a drop-off event is when an object is placed at a location.

In the case of detecting a pick-up event, performing the first analysis at step 150 may comprise determining, upon detecting the pick-up event of the object, whether an entity triggering the pick-up event corresponds to the determined user associated with the identified object, based on the one or more predefined rules stored in the knowledge base. An example input to the knowledge base in this instance may be "user A picked up object D".

Also, alternatively or in addition, in the case of detecting a drop-off event, performing the first analysis at step 150 may comprise determining, upon detecting the drop-off event of the object, whether an entity triggering the drop-off event corresponds to the determined user associated with the identified object, based on the one or more predefined rules stored in the knowledge base. An example input to the knowledge base in this instance may be "user A dropped object D".

In some embodiments, detecting the pick-up event or the drop-off event of the object may be based on a third learning module. The third learning module may be a supervised learning module that is pre-trained based on at least one of: distances between an object and one or more users or entities associated with the respective object for one or more objects, audio and/or visual data associated with displacement of one or more objects, and a range of speed and/or acceleration of movement of an object during displacement of the respective object for one or more objects. The one or more objects referred to in this particular context may or may not include the identified object. In these embodiments, if a threshold of the third learning module is violated (e.g. an increased distance between an object and the user associated with the object or an increased distance between an object and a secondary subject such as a pet or a child), it may be determined/detected that a drop-off event has occurred.

It will be appreciated that in some cases an object can be moved from location to another (e.g. from the floor to a shelf or to another room), and in this instance the method may include detecting both a pick-up event and a drop-off event.

Returning to FIG. 1, at step 160, a second analysis is performed to determine whether the current status of the identified contains an anomaly, using a second learning module. The second learning module comprises a semi-supervised or unsupervised learning module. The second learning module may include clustering of a plurality of object identifiers into a plurality of groups, wherein the plurality of groups are associated with at least one of: a location, a user, and a date and/or time. In some embodiments, step 160 may be performed simultaneously with step 150.

The current status of the object may be represented by an input vector in a format with at least one of the follow columns: [user id, object_id <int or string>, timestamp <timestamp object>, coordinates <tuple of x, y, z coordinates>, nearbyObjects<array of string>, color <string>], where the angle parentheses indicate the data type (e.g. "string") for a respective column. Object_id represents an identifier of the identified object and "nearbyObjects" indicates one or more other objects in the vicinity of the identified object. In these embodiments, performing the second analysis at step 160 may comprise assigning the vector representing the current status to one of a plurality of previously-generated clusters of the second learning module. If subsequent to such assignment the cluster associated with the identified object is different from historical cluster(s) associated with the identified object, the current status may be determined as containing an anomaly. In this case, the result of step 160 may indicate that there is an anomaly (e.g. an output including a true Boolean variable for a "isAnomaly" field).

As mentioned above, in some embodiments the method may further comprise detecting a change in location of the object based on the sensor data acquired at step 110, in these embodiments, performing the second analysis at step 160 may comprise determining whether an entity carrying the object corresponding to the determined user associated with the identified object, using the second learning module.

Also, as mentioned above, in some embodiments the method may further comprise detecting a change in location of the object, and detecting a pick-up event of the object based on whether the detected change in location of the identified object involves an instantaneous displacement from a location. In these embodiments, performing the second analysis at step 160 may comprise determining, upon detecting the pick-up event of the object, whether an entity (e.g. a user or a secondary subject) triggering the pick-up event or an entity carrying the object after the pick-up event corresponds to the determined user associated with the identified object, using the second learning module. An example input to the second learning module in this instance may be "user A picked up object D".

Also, as mentioned above, in some embodiments the method may further comprise detecting a drop-off event of the object based on whether the detected change in location of the identified object involves an instantaneous displacement from a location. In these embodiments, performing the second analysis at step 160 may comprise determining, upon detecting the drop-off event of the object, whether an entity triggering the drop-off event corresponds to the determined user associated with the identified object, using the second learning module. An example input to the knowledge base in this instance may be "user A dropped object D".

Although not shown in the drawing, the method may further comprise determining whether the determined user associated with the identified object is in the vicinity of the object upon detecting a change in location of the object in some embodiments. In these embodiments, performing at least one of the first analysis at step 150 and the second analysis at step 160 may be further based on whether the user associated with the identified object is in the vicinity subsequent to the change in location of the object.

Returning to FIG. 1, at step 170, it is validated whether the current status of the identified object contains an anomaly based on results of the first analysis performed at step 150 and results of the second analysis performed at step 160. An example of anomaly in the context of the present disclosure may include when an object falls from its normal location (e.g. a shelf) onto the floor when there is no one nearby. Another example of anomaly is when a known object is placed at a new location. Validating whether the current status contains an anomaly at step 170 may comprise compiling results from steps 150 and 160. Alternatively or additionally, validating whether the current status of the identified object contains an anomaly may be further based on a relative weighting of the second learning module. The relative weighting may be at least based on a level of output uncertainty of the second learning module. For example, if the level of output uncertainty of the second learning module is high (e.g. compared to a predetermined threshold), the relative weighting given to the result of the second analysis from step 160 may be lower compared to the result of the first analysis from step 150.

By way of illustration, an example of step 170 of FIG. 1 is provided in the following:

If the result of step 150 indicates there is no anomaly and the result of step 160 indicates there is no anomaly, then it would be validated at step 170 that there is no anomaly.

If the result of step 150 indicates there is an anomaly and the result of step 160 indicates there is no anomaly, then it would be determined at step 170 that there is an anomaly, and the second learning module may be retrained accordingly.

If the result of step 150 indicates that there is no anomaly and the result of step 160 indicates there is an anomaly, then at step 170 the knowledge base would be cross-checked to determine whether there is an anomaly.

Subsequently, if the result of the cross-checking indicates that there is an anomaly, at least one of the one or more rules in the knowledge base may be amended accordingly, and it would be validated at step 170 that there is an anomaly.

On the other hand, if the result of the cross-checking indicates that there is no anomaly, the second learning module may be retrained accordingly, and it would be validated at step 170 that there is no anomaly.

If the result of step 150 indicates that there is no anomaly and the result of step 160 indicates that there is no anomaly, then it would be validated that there is no anomaly.

Subsequent to step 170, an output indicating the anomaly may be generated, upon validating that the detected status contains an anomaly. The output may be generated in the format of a vector, e.g. [object id, timestamped location, isAnomaly], where object id is the identifier of the object and "isAnomaly" indicates that there is an anomaly. This step is not illustrated in FIG. 1. Alternatively or additionally, upon validating that the detected status contains an anomaly the method may include outputting via a display unit at least a part of the current status (e.g. the timestamped location with the identifier of the identified object). The at least part of the current status may be output alongside the generated output indicating the anomaly. The generated output may be useful in informing user(s) of unusual activity related to their object(s).

If it is validated at step 170 that the detected current status of the identified object contains an anomaly, the method may further comprise performing at least one of: updating a database using results of the validation, updating the knowledge base based on results of the validation, and training the second learning module based on of the validation. The database may contain at least one of: one or more usual locations with respect to time and/or date for a plurality of objects including the identified object. Furthermore, in these embodiments, the method may further comprise: receiving a user query of a location of an object via a user interface, retrieving, from the data base, at least one of the latest updated location of the object and the usual location of the objected based on the user query, and outputting the retrieved information via the user interface. Therefore, if a user forgets the location of a certain object, they can retrieve such information via a query.

If it is validated at step 170 that the detected current status of the identified object does not contain an anomaly, the method may further comprise performing at least one of: updating the knowledge based on at least one of the results of the first analysis and the results of the second analysis, and training the second learning module based on at least one of the results of the first analysis and the results of the second analysis. Moreover, if it is validated at step 170 that the detected current status of the identified object does not contain an anomaly, the method may alternatively or additionally include outputting via a display unit at least a part of the current status (e.g. the timestamped location with the identifier of the identified object). The at least part of the current status may be output with an indication that there is no anomaly in the current status.

Although not shown in the drawing, the method may further comprise updating the knowledge base with an identifier of the identified object and the determined user associated with the identified object, and training the second learning module with an identifier of the identified object and the determined user associated with the identified object.

Although not shown in the drawing, the method may further comprise acquiring data from one or more devices detectable via a radio access point (e.g. a Wi-Fi router). In these embodiments, at least one of: identifying the object at step 120, determining a user associated with the identified object at step 130, and determining at timestamped location of the identified object ate step 140 may be further based on the acquired data from the one or more devices.

It will be appreciated that although some of the steps in the method illustrated in FIG. 1 have been described as being performed sequentially, in some embodiments at least some of the steps in the illustrated method may be performed in a different order, and/or at least some of the steps in the illustrated method may be performed simultaneously.

Figure 2:
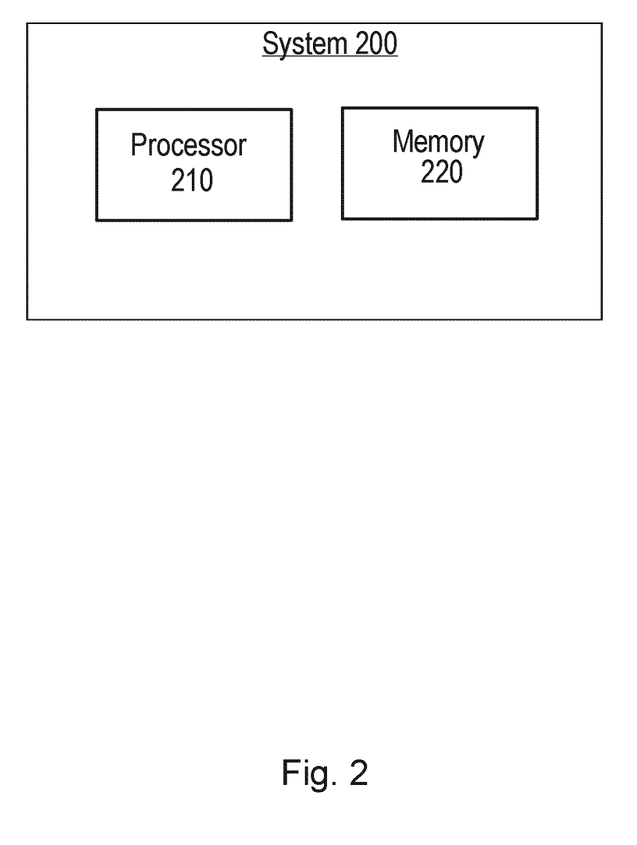
FIG. 2 is a block diagram of a system for object tracking using machine learning, according to an embodiment.

FIG. 2 is a block diagram of a system for object tracking using machine learning, according to an embodiment. The system 200 comprises one or more processors 210 and a memory 220.

The memory 220 stores instructions that, when executed by the one or more processors 210, cause the system 200 to acquire sensor data from one or more sensors, identify the object based on the acquired sensor data using a first learning module, and determine a user associated with the identified object using the first learning module.

In the present embodiment, the sensor data is related to an object, and the first learning module comprises a supervised or unsupervised learning module. The sensor data may comprise audio and/or visual sensor data (e.g. data from a microphone and/or a camera). Furthermore, the sensor data may be acquired in stream(s). The first learning module may be pre-trained using information including at least one of: audio and/or visual data associated with one or more usual locations for a plurality of objects, and one or more users associated with the plurality of objects.

In the present embodiment, the system 200 is further caused to: determine a timestamped location of the identified object based on at least one of the acquired sensor data and one or more locations of the one or more sensors, perform a first analysis to determine whether the current status of the identified object contains an anomaly based on one or more predefined rules stored in a knowledge base, perform a second analysis to determine whether the current status of the identified contains an anomaly, using a second learning module, and validate whether the current status of the identified object contains an anomaly based on results of the first analysis and results of the second analysis. The current status is defined by: an identifier of the identified object, the determined user associated with the identified object, and the timestamped location of the identified object. The second learning module comprises a semi-supervised or unsupervised learning module, and may include clustering of a plurality of object identifiers into a plurality of groups, wherein the plurality of groups are associated with at least one of: a location, a user, and a date and/or time.

In some embodiments, the determination of a timestamped location of the identified object may be performed in a continuous manner such that location of the identified object is continuously tracked with respect to time. The determination of the location of the identified object may be interrupted if the object is out of a detection range of the one or more sensors or if a drop-off event is detected. In some embodiments, the time stamped location of the identified object may be determined based on a known location or a detected location of at least one of the one or more sensors.

As an example, the location of the identified object may be determined with respect to at least one of the one or more sensor(s). In this case, the location of a sensor that is used to identify the object may be known (e.g. as it is fixed to a certain location), and the object may be detected or recognized on the basis of that sensor by using object detection techniques. The location of the object can then be determined in the format such as "same room as the camera (sensor)", "in front of camera (sensor) 1", and/or "X cm from camera 1" (where X is a variable). It will be appreciated that other formats similar to these examples are also possible. In some embodiments, the data from the one or more sensors may be used for both identifying the object and for determining the location of the object. In this case, the location may be determined in the format such as "on the desk", "on the floor", and/or "X cm from the door" (where X is a variable), etc.

Furthermore, in some embodiments the location(s) of the one or more sensors may be fixed and therefore already known and can be acquired/stored in a straightforward manner. Alternatively, in some embodiments the location(s) of the one more sensors may be determined via the input received at the one or more sensors. For example, using object detection techniques it can be determined that a sensor is "X cm from the door" and/or "Y cm above the floor" (where X and Y are variables), and on this basis the location of the identified object can be determined. Alternatively, in some embodiments the one or more sensors may be mounted on device(s) (e.g. mobile phone, tablet, smart glasses, etc.) and the location(s) of these one or more sensors can be detected using Global Positioning System (GPS), Bluetooth, signal strength, etc. In this instance, the timestamped location may be helpful in informing a user whether an object is inadvertently dropped, and where, in certain contexts (e.g. during jogging, windsurfing, skiing, etc.).

In some embodiments, the knowledge base may be represented as a graph containing information about the common combinations of identifiers of objects, associated users, and characteristics of objects (e.g. color). In these embodiments, a "graph builder" functionality may be provided for converting an input (i.e. at least a part of the current status of the identified object) into a graph for the purpose of comparison, and this graph builder functionality may be performed by the system 200 according to the stored instructions in the memory 220. If a match is found from the comparison, the result of the first analysis would indicate that there is no anomaly (e.g. an output including a false Boolean variable for an "isAnomaly" field). On the other hand, if the graph corresponding to the input does not match any part of the graph representing the knowledge base, the result of the first analysis would indicate that there is an anomaly (e.g. an output including a true Boolean variable of the "is Anomaly" field). For example, the graph corresponding to the input may indicate that user A has object B and that object B has color C, and this observation may not fit into the graph representing the knowledge base because the graph representing the knowledge base expects user A to have an object B with the color D (instead of color C). Therefore, in this case, the result of the first analysis would indicate that there is an anomaly in the current status of the object.

In some embodiments, the current status may be represented by an input vector in a format with at least one of the follow columns: [user id, object_id<int or string>, timestamp <timestamp object>, coordinates <tuple of x, y, z coordinates>, nearbyObjects<array of string>, color <string>], where the angle parentheses indicate the data type (e.g. "string") for a respective column. Object_id represents an identifier of the identified object and "nearbyObjects" indicates one or more other objects in the vicinity of the identified object. In these embodiments, performing the second analysis at may comprise assigning the vector representing the current status to one of a plurality of previously-generated clusters of the second learning module. If subsequent to such assignment the cluster associated with the identified object is different from historical cluster(s) associated with the identified object, the current status may be determined as containing an anomaly. In this case, the result of the second analysis may indicate that there is an anomaly (e.g. an output including a true Boolean variable for a "isAnomaly" field).

In some embodiments, validating whether the current status of the identified object contains an anomaly may be performed in the way as explained in the example provided above with respect to step 170 of FIG. 1. Alternatively or additionally, validating whether the current status contains an anomaly at step 170 may comprise compiling results from both the first analysis and the second analysis. Alternatively or additionally, validating whether the current status of the identified object contains an anomaly may be further based on a relative weighting of the second learning module, wherein the relative weighting may be at least based on a level of output uncertainty of the second learning module. For example, if the level of output uncertainty of the second learning module is high (e.g. compared to a predetermined threshold), the relative weighting given to the result of the second analysis may be lower compared to the result of the first analysis.

In some embodiments, when the stored instructions is executed by the one or more processors 210, the system 200 may be further caused to generate an output indicating the anomaly upon validating that the detected status contains an anomaly. The output may be generated in the format of a vector, e.g. [object id, timestamped location, isAnomaly], where object id is the identifier of the object and "isAnomaly" indicates that there is an anomaly. Alternatively or additionally, upon validating that the detected status contains an anomaly the system 200 may be caused to output via a display unit at least a part of the current status (e.g. the timestamped location with the identifier of the identified object). The at least part of the current status may be output alongside the generated output indicating the anomaly.

In some embodiments, when the stored instructions is executed by the one or more processors 210, the system 200 may be further caused to detect a change in location of the object based on the acquired sensor data. In these embodiments, the current status of the object may be further defined by the detected change in location of the identified object. Furthermore, in these embodiments, performing the first analysis may comprise determining whether an entity carrying the object corresponding to the determined user associated with the identified object, based on the one or more predefined rules stored in the knowledge base, and performing the second analysis may comprise determining whether an entity carrying the object corresponding to the determined user associated with the identified object, using the second learning module. The detection of the entity may be based on the acquired sensor data.

In some embodiments, when the stored instructions is executed by the one or more processors 210, the system 200 may be further caused to perform at least one of the following if it is validated that the detected current status of the identified object contains an anomaly: update a database using results of the validation, update the knowledge base based on results of the validation, and train the second learning module based on of the validation. The database may contain at least one of: one or more usual locations with respect to time and/or date (e.g. calendar date) for a plurality of objects including the identified object. In these embodiments, when the stored instructions is executed by the one or more processors 210, the system 200 may be further caused to receive a user query of a location of an object via a user interface, retrieve, from the data base, at least one of the latest updated location of the object and the usual location of the objected based on the user query, and output the retrieved information via the user interface. Therefore, if a user forgets the location of a certain object, they can retrieve such information via a query.

In some embodiments, when the stored instructions is executed by the one or more processors 210, the system 200 may be further caused to perform at least one of the following if it is validated that the detected current status of the identified object does not contain an anomaly: update the knowledge based on at least one of the results of the first analysis and the results of the second analysis, and train the second learning module based on at least one of the results of the first analysis and the results of the second analysis. Additionally or alternatively, if it is validated that the detected current status of the identified object does not contain an anomaly, the system may be caused to output via a display unit at least a part of the current status (e.g. the timestamped location with the identifier of the identified object). The at least part of the current status may be output alongside an indication that the current status does not contain an anomaly.

In some embodiments, wherein the one or more predefined rules in the knowledge base is associated with at least one of: one or more users associated with an object, and one or more characteristics of an object. For example, the one or more predefined rules may be associated with at least one of: a type of the object, a size of the object, a shape of the object, a color of the object, and a sound associated with movement of the object (e.g. keys being placed at a location). The one or more rules in the knowledge base may be useful for the identification of the object especially where several objects are very similar to each other.

In some embodiments, when the stored instructions is executed by the one or more processors 210, the system 200 may be further caused to detect a pick-up event or a drop-off event of the object based on whether the detected change in location of the identified object involves an instantaneous displacement from a location. A pick-up event is when an object is retrieved or moved from a location, and a drop-off event is when an object is placed at a location.

In these embodiments, performing the first analysis may comprise determining, upon detecting the pick-up event of the object, whether an entity triggering the pick-up event corresponds to the determined user associated with the identified object, based on the one or more predefined rules stored in the knowledge base. Furthermore, in these embodiments performing the second analysis may comprise determining, upon detecting the pick-up event of the object, whether an entity triggering the pick-up event corresponds to the determined user associated with the identified object, using the second learning module. Alternatively or in addition, performing the first analysis may comprise determining, upon detecting the drop-off event of the object, whether an entity triggering the drop-off event corresponds to the determined user associated with the identified object, based on the one or more predefined rules stored in the knowledge base. Furthermore, in these embodiments performing the second analysis may comprise determining, upon detecting the pick-up event of the object, whether an entity triggering the drop-off event corresponds to the determined user associated with the identified object, using the second learning module.

In embodiments where the system 200 is caused to detect a pick-up event or a drop-off event, the detection may be based on a third learning module. The third learning module may be a supervised learning module that is pre-trained based on at least one of: distances between an object and one or more users or entities associated with the respective object for one or more objects, audio and/or visual data associated with displacement of one or more objects, and a range of speed and/or acceleration of movement of an object during displacement of the respective object for one or more objects. The one or more objects referred to in this particular context may or may not include the identified object.

It will be appreciated that in some cases an object can be moved from location to another (e.g. from the floor to a shelf or to another room), and in this instance both a pick-up event and a drop-off event can be detected.

In some embodiments, determining whether the determined user associated with the identified object is in the vicinity of the object upon detecting a change in location of the object, wherein performing at least one of the first analysis and the second analysis is further based on whether the user associated with the identified object is in the vicinity subsequent to the change in location of the object.

In some embodiments, when the stored instructions is executed by the one or more processors 210, the system 200 may be caused to determine whether the determined user associated with the identified object is in the vicinity of the object upon detecting a change in location of the object. In these embodiments, performing at least one of the first analysis and the second analysis may be further based on whether the user associated with the identified object is in the vicinity subsequent to the change in location of the object.

In some embodiments, identifying the object using the first learning module may comprise determining that the object does not correspond to a known object with respect to at least one of the first learning module, the second learning module, and the knowledge base. In these embodiments, determining a user associated with the identified object may be performed using an inference engine of the first learning module. Moreover, the method may further include associating, using the inference engine, the object with a usual location of an object associated with the determined user, for example an object of a same type (e.g. phones) or similar type (e.g. clothing like gloves and hats).

In some embodiments, when the stored instructions is executed by the one or more processors 210, the system 200 may be caused to update the knowledge base with an identifier of the identified object and the determined user associated with the identified object, and to train the second learning module with an identifier of the identified object and the determined user associated with the identified object.

In some embodiments, when the stored instructions is executed by the one or more processors 210, the system 200 may be caused to acquire data from one or more devices detectable via a radio access point (e.g. a Wi-Fi router). In these embodiment, at least one of: identifying the object, determining a user associated with the identified object, and determining at timestamped location of the identified object may be further based on the acquired data from the one or more devices.

It will be appreciated that FIG. 2 only shows the components required to illustrate an aspect of the system 200 and, in a practical implementation, the system 200 may comprise alternative or additional components to those shown.

Figure 3A:
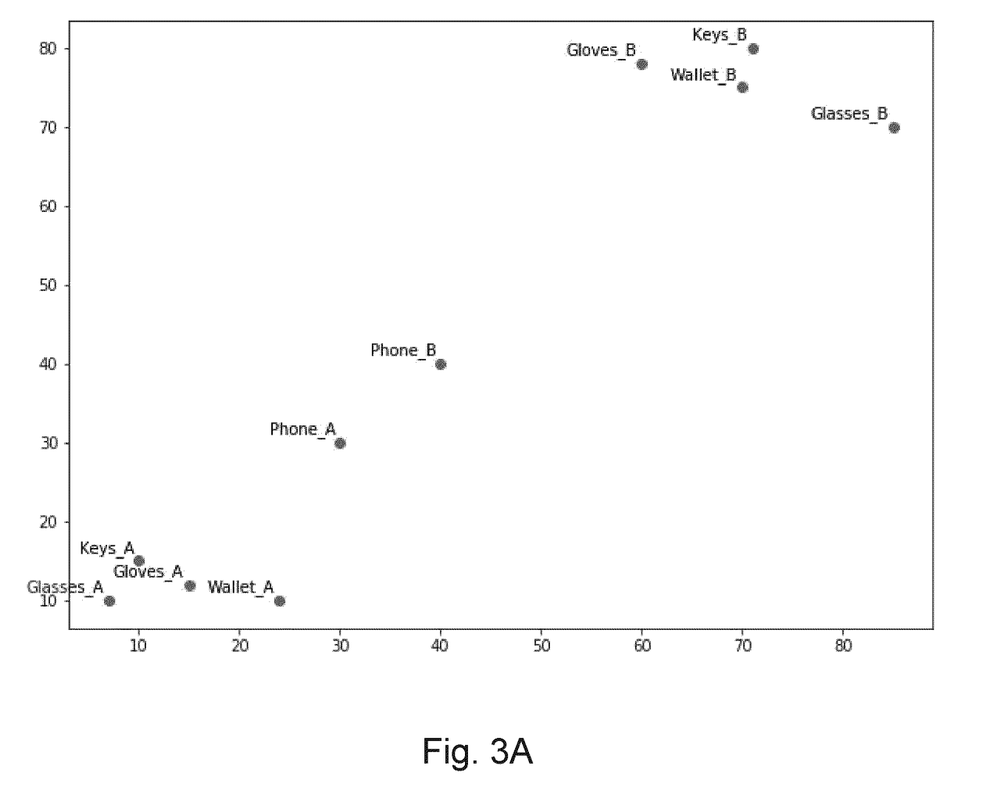
FIG. 3A is a graph representing an example of locations of a plurality of objects in a room as view from a two-dimensional top-down perspective, according to an embodiment.

FIG. 3A is a graph representing an example of locations of a plurality of objects in a room as view from a two-dimensional (2D) top-down perspective according to an embodiment, and FIG. 36 is a graph representing an example of a hierarchical cluster of the plurality of objects of FIG. 3A. In more detail, the graph shown in FIG. 3B is an example of a cluster associated with the second learning module as described above with reference to FIGS. 1 and 2.

The graph of FIG. 3A is presented in a two-dimensional plot format for illustration purposes, and it will be understood that in some implementations of the present embodiments 2D or 3D techniques are both applicable with respect to the detection and tracking of locations of items. Also, in some embodiments, a compressed 2D representation including multidimensional v]ectors can be used, where the multidimensional vectors would represent objects in the room.

In the example shown in FIG. 3A, the location of an object is represented by a dot in the graph with a label in the format of "[Object name]_[User]". For example, the dot corresponding to the keys belonging to user A is labelled "Keys_A" and the dot corresponding to the wallet belonging to user A is labelled "Wallet_A". Similarly, the dot corresponding to the gloves belonging to user B is labelled "Gloves_B" and the dot corresponding to the glasses belonging to user B is labelled "Glasses_B". Accordingly, the distances between the dots in the graph correspond to the relative distances (and proximity) between the objects in the room.

Figure 3B:
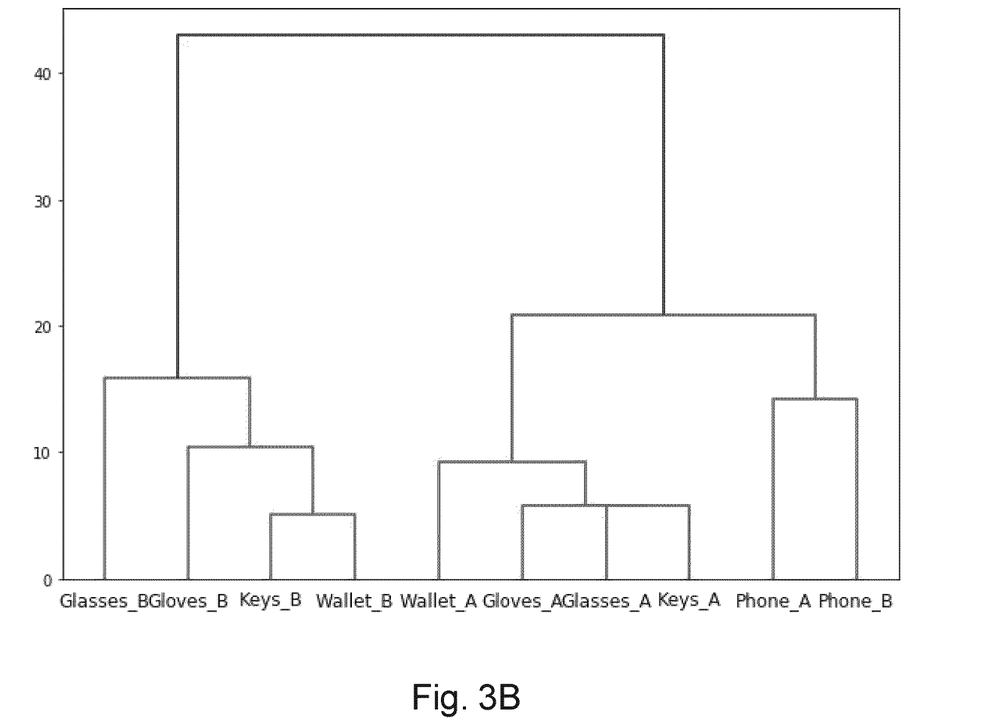
FIG. 3B is a graph representing an example of a hierarchical cluster of the plurality of objects of FIG. 3A.

To arrive at the structure shown in FIG. 3B, the proximity between the plurality of objects may be detected and/or measured via sensor data (e.g. sensor data as acquired in the way described with respect to FIG. 1 and FIG. 2). The objects can be clustered based on the differences between them. For example, objects that share the same usual location may be clustered into a group.

In some embodiments of the present disclosure, the second learning module, which may be an unsupervised learning module, may be pre-trained with datasets without labels before deployment. Each object known by the second learning module may be periodically assigned to a nearest cluster, and clusters are monitored for changes. For example, it can be flagged if there is a temporal change in the cluster identifier of a cluster to which an object belongs over time, and such change can be used as additional information for training the second learning module. In the example as shown in FIG. 3B, the first cluster (on the left), which is associated with a specific cluster identifier, includes mainly objects associated with user B: "Glasses_B", "Gloves_B", "Keys_B", and "Wallet_B", and the first branch (in the middle) of a second cluster, which is associated with another specific cluster identifier, includes objects associated with user A: "Wallet_A", "Gloves_A", "Glasses_A", and "Keys_A". However, since "Phone_A" (associated with user A) and "Phone_B" (associated with user B) are often placed nearby each other and also near objects associated with user A, these objects are placed into a second branch (on the left) in the second cluster. In some embodiments cluster identifiers are provided as an integer between 0 to N, where N is the number of possible clusters. Also, it is noted that even though in the present example clusters are defined by way of the physical locations of the plurality of objects, in alternative embodiments the clusters may be defined by alternative or additional properties (e.g. timestamp).

Thus, embodiments of the present disclosure provide methods and systems for object tracking using machine learning, thereby improving accuracy of location detection and tracking as well as the determination of anomalies in locations without the use of identification tags. For example, by using knowledge base techniques (which involves a reasoning system) and unsupervised learning techniques, the confidence and accuracy in the detection of objects and locations of objects would be higher compared to if location information was determined solely based on sensor data, since these techniques involve detecting normal behavior and anomalies.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

The invention claimed is:

1. A computer-implemented method for object tracking using machine learning, the method comprising:
acquiring sensor data from one or more sensors, wherein the sensor data is related to an object;
identifying the object based on the acquired sensor data using a first learning module, wherein the first learning module comprises a supervised or unsupervised learning module;
determining a user associated with the identified object using the first learning module;

determining a timestamped location of the identified object based on at least one of the acquired sensor data and one or more locations of the one or more sensors;

performing a first analysis to determine whether a current status of the identified object contains an anomaly based on one or more predefined rules stored in a knowledge base, wherein the current status is defined by: an identifier of the identified object, the determined user associated with the identified object, and the timestamped location of the identified object;

performing a second analysis to determine whether the current status of the identified object contains an anomaly, using a second learning module, wherein the second learning module comprises a semi-supervised or unsupervised learning module; and validating whether the current status of the identified object contains an anomaly based on results of the first analysis and results of the second analysis.

2. The computer-implemented method according to claim 1, further comprising detecting a change in location of the object based on the acquired sensor data, wherein the current status of the object is further defined by the detected change in location of the identified object.

3. The computer-implemented method according to claim 1, further comprising detecting an entity in the vicinity of the identified object based on the acquired sensor data.

4. The computer-implemented method according to claim 2, further comprising detecting a pick-up event of the object based on whether the detected change in location of the identified object involves an instantaneous displacement from a location, wherein performing the first analysis comprises determining, upon detecting the pick-up event of the object, whether an entity triggering the pick-up event corresponds to the determined user associated with the identified object, based on the one or more predefined rules stored in the knowledge base, and wherein performing the second analysis comprises determining, upon detecting the pick-up event of the object, whether an entity triggering the pick-up event or an entity carrying the object after the pick-up event corresponds to the determined user associated with the identified object, using the second learning module.

5. The computer-implemented method according to claim 2, further comprising detecting a drop-off event of the object based on whether the detected change in location of the identified object involves a placement of the object, wherein performing the first analysis comprises determining, upon detecting the drop-off event of the object, whether an entity triggering the drop-off event corresponds to the determined user associated with the identified object, based on the one or more predefined rules stored in the knowledge base, and wherein performing the second analysis comprises determining, upon detecting the drop-off event the object, whether an entity triggering the drop-off event corresponds to the determined user associated with the identified object, using the second learning module.

6. The computer-implemented method according to claim 2, wherein detecting a pick-up event or a drop-off event of the object is based on a third learning module, and wherein the third learning module comprises a supervised learning module that is pre-trained based on at least one of: distances between an object and one or more users or entities associated with the respective object, for one or more objects; audio and/or visual data associated with displacement of one or more objects; and a range of speed and/or acceleration of movement of an object during displacement of the respective object for one or more of objects.

7. The computer-implemented method according to claim 2, further comprising determining whether the determined user associated with the identified object is in the vicinity of the object upon detecting a change in location of the object, wherein performing at least one of the first analysis and the second analysis is further based on whether the user associated with the identified object is in the vicinity of the object subsequent to the change in location of the object.

8. The computer-implemented method according to claim 1, wherein identifying the object using the first learning module comprises determining that the object does not correspond to a known object with respect to at least one of the first learning module, the second learning module, and the knowledge base, and wherein determining a user associated with the identified object is performed using an inference engine of the first learning module, the method further comprising at least one of the following steps:

updating the knowledge base with an identifier of the identified object and the determined user associated with the identified object; and training the second learning module with an identifier of the identified object and the determined user associated with the identified object.

9. The computer-implemented method according to claim 1, further comprising generating an output indicating the anomaly upon validating that the current status contains an anomaly.

10. The computer-implemented method according to claim 1, further comprising, if it is validated that the current status of the identified object contains an anomaly, performing at least one of:

updating a database using results of the validation, wherein the database contains at least one of: one or more usual locations with respect to time and/or date for a plurality of objects including the identified object;

updating the knowledge base based on results of the validation; and training the second learning module based on of the validation.

11. The computer-implemented method according to claim 10, further comprising:

receiving a user query of a location of the object via a user interface;

retrieving, from the data base, at least one of the latest updated location of the object and the usual location of the object based on the user query; and outputting the retrieved information via the user interface.

12. The computer-implemented method according to claim 1, further comprising, if it is validated that the current status of the identified object does not contain an anomaly, performing at least one of:

updating the knowledge base based on at least one of the results of the first analysis and the results of the second analysis; and training the second learning module based on at least one of the results of the first analysis and the results of the second analysis.

13. The computer-implemented method according to claim 1, wherein the second learning module includes clustering of a plurality of object identifiers into a plurality of groups, wherein the plurality of groups are associated with at least one of: a location, a user, and a date and/or time.

14. The computer-implemented method according to claim 1, wherein validating whether the current status of the identified object contains an anomaly is further based on a relative weighting of the second learning module, wherein the relative weighting is at least based on a level of output uncertainty of the second learning module.

15. The computer-implemented method according to claim 1, wherein the one or more predefined rules in the knowledge base is associated with at least one of: one or more users associated with an object, and one or more characteristics of an object.

16. The computer-implemented method according to claim 1, further comprising acquiring data from one or more devices detectable via a radio access point, wherein at least one of: identifying the object, determining a user associated with the identified object, and determining at timestamped location of the identified object is further based on the acquired data from the one or more devices.

17. The computer-implemented method according to claim 1 wherein the first learning module is pre-trained using information including at least one of:
audio and/or visual data associated with one or more usual locations for a plurality of objects; and
one or more users associated with the plurality of objects.

18. The computer-implemented method according to claim 1, wherein the sensor data comprises audio and/or visual sensor data.

19. The computer-implemented method according to claim 1, wherein determining the timestamped location of the identified object is based on a known location or a detected location of at least one of the one or more sensors.

20. A system for object tracking using machine learning comprising:
one or more processors; and
a memory storing instructions that, when executed by the one or more processors, cause the system to:
acquire sensor data from one or more sensors, wherein the sensor data is related to an object;
identify the object based on the acquired sensor data using a first learning module, wherein the first learning module comprises a supervised or unsupervised learning module;
determine a user associated with the identified object using the first learning module;
determine a timestamped location of the identified object based on at least one of the acquired sensor data and one or more locations of the one or more sensors;
perform a first analysis to determine whether a current status of the identified object contains an anomaly based on one or more predefined rules stored in a knowledge base, wherein the current status is defined by: an identifier of the identified object, the determined user associated with the identified object, and the timestamped location of the identified object;
perform a second analysis to determine whether the current status of the identified object contains an anomaly, using a second learning module, wherein the second learning module comprises a semi-supervised or unsupervised learning module; and
validate whether the current status of the identified object contains an anomaly based on results of the first analysis and results of the second analysis.

* * * * *